United States Patent [19]

Remick, II

[11] Patent Number: 5,288,533
[45] Date of Patent: Feb. 22, 1994

[54] ADHESIVE LENS HOLDER

[76] Inventor: Marlin W. Remick, II, 815 Rutledge Rd., Chesapeake, Va. 23320

[21] Appl. No.: 812,098

[22] Filed: Dec. 23, 1991

[51] Int. Cl.⁵ .............................................. G02B 7/02
[52] U.S. Cl. ..................................... 428/45; 351/154; 428/66; 428/122; 428/358
[58] Field of Search ................ 351/154; 428/122, 358, 428/45, 66

[56] References Cited

U.S. PATENT DOCUMENTS

| | | | |
|---|---|---|---|
| 1,785,929 | 12/1930 | Bouchard | 351/102 |
| 1,995,617 | 3/1935 | Katz | 351/154 |
| 2,387,789 | 10/1945 | Williams | 351/154 X |
| 3,243,249 | 3/1966 | Lissac | 351/154 |
| 3,829,201 | 8/1974 | Whiting | 351/154 |
| 4,340,282 | 7/1982 | Murakami | 351/154 |
| 4,463,053 | 7/1984 | Brinegar | 428/38 X |
| 4,496,617 | 1/1985 | Parker | 428/55 |
| 4,921,341 | 5/1990 | Ace | 351/86 |
| 4,971,431 | 11/1990 | Gerard | 351/154 X |

*Primary Examiner*—Henry F. Epstein
*Attorney, Agent, or Firm*—Richard C. Litman

[57] ABSTRACT

A temporary adhesive lens securing device is provided with low tack adhesive for temporarily securing a lens to a frame in order to hold the lens in piace temporarily to allow conventional permanent affixing to occur. The temporary device is composed of strip members in a variety of configurations. The strip members are made of clear plastic material and do not show up against the background of the lens and frame. The temporary lens securing device is used by professionals, i.e., ophthalmologists, optometrists and opticians, when mounting lenses and is not permanently affixed to the frames. This device may be also used to securely mount a lens to a frame where the lens has been cut too small for a particular frame. The strip would effectively increase the circumference of the lens so that no gap between the lens and frame would exist.

4 Claims, 1 Drawing Sheet

ADHESIVE LENS HOLDER

FIELD OF THE INVENTION

The present invention relates to a lens securing device. More specifically this device relates to a thin strip with a very low tack adhesive placed on its surface.

DESCRIPTION OF THE PRIOR ART

U.S. Pat. No. 1,785,929 issued on Dec. 23, 1930 to Samuel E. Bouchard discloses a ophthalmic mounting. The mounting is a non-metallic rim which is forced over the lens.

U.S. Pat. No. 1,995,617 issued on Mar. 26, 1935 to Herman Katz discloses a lens lining for spectacle frames. No low tack adhesive is disclosed.

U.S. Pat. No. 2,387,789 issued on Oct. 30, 1945 to William E. Williams discloses ophthalmic mountings. These mountings are used to surround the circumference of the lens to protect it in a rimless frame.

U.S. Pat. No. 3,243,249 issued on Mar. 29, 1966 to George H. E. Lissac discloses an ophthalmic lens mounting. These mountings are adhesively bonded to the upper lens edge and grooved frontal bar.

U.S. Pat. No. 3,829,201 issued on Aug. 13, 1974 to Harold F. Whiting discloses a permanent lining designed to secure the lens.

U.S. Pat. No. 4,340,282 issued on Jul. 20, 1982 to Mamoru Murakami discloses a lens securing device. This is another permanent lining designed to secure the lens.

U.S. Pat. No. 4,121,341 issued on May 1, 1990 to Ronald S. Ace discloses an ophthalmic lens safety liner. The liner is adapted to be mounted on the peripheral edge of the eyeglass lens.

None of the above referenced devices, considered either singly or in combination, is seen to suggest the instant invention as disclosed and claimed.

SUMMARY OF THE INVENTION

The instant invention is concerned with temporary lens securing device which includes a strip member which is to be attached to the frame by use of a low tack adhesive, which will permit the lens to be held in place until secured in place by conventional means. The instant invention will be coated on one side with a low tack adhesive to attach it to the inside rim of the frame eyewire where needed. The purpose is to secure a lens that has been cut too small for a particular frame. The strip would effectively increase the circumference of the lens so that no gap between the lens and frame would exist. The strip member would also have use when switching lenses from one frame to another. If a new frame were a millimeter larger in eyesize the strip member could again increase the circumference of the lens to fit the frame. The strip member could also help protect a fragile glass lens edge from a metal eyewire so that it would not chip.

Accordingly, one object of the present invention is to provide a low tack adhesive strip member for in shop use.

Another object of the present invention is to provide a variety of configurations of strip members for use with a variety of frames and lenses.

Another object of the present invention is to provide a strip member with low tack adhesive on both of its sides.

Another object of the present invent is to provide a strip member to protect the circumferential edges of a thin lens.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
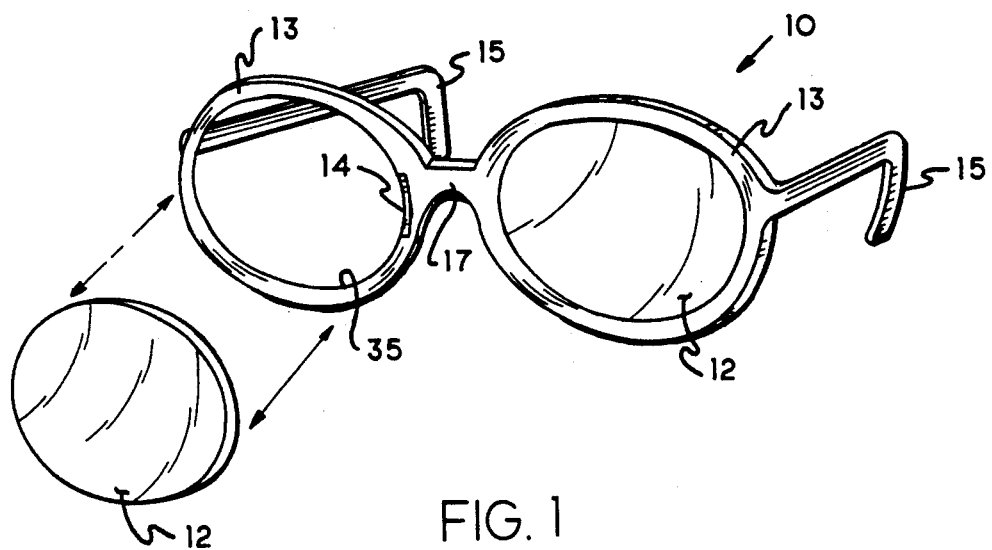
FIG. 1 discloses an environmental perspective view of an embodiment of the instant invention.

With reference to FIG. 1 the present invention comprises a strip member 14 with a low tack adhesive use din combination with a conventional frame assembly 10. The frame assembly 10 comprises a pair of frame elements 13 for securing the lenses 12, and a pair of temples 15 for placement over the ears. The frame elements 13 are connected by a bridge member 17. The strip member 14 is placed on the interior of the frame element 13, and the low tack adhesive holds it in place. Then the lens 12 is placed in the frame element 13 where the strip member 14 holds it in place. At this point conventional securing means such as adhesive or plastic welding are used to permanently secure the lens 12 to the interior perimeter frame element 35. In this fashion the strip member 14 permits the lens 12 to be stabilized while the final connection between the lens 13 and frame element 13 are made by such conventional means.

Figure 2:
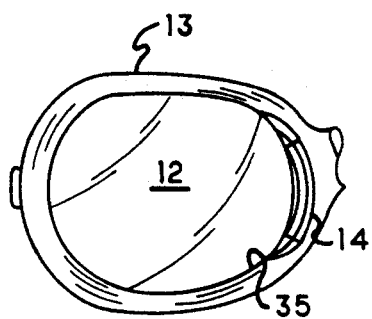
FIG. 2 discloses a perspective view of the instant invention in use.

With reference to FIG. 2, the present invention can be used to permit a lens 12 which is too small to fit into an existing frame element 13. In this case the strip member 14 physically embraces the lens 12 enabling it to fit in the frame element 13.

Figure 3A:
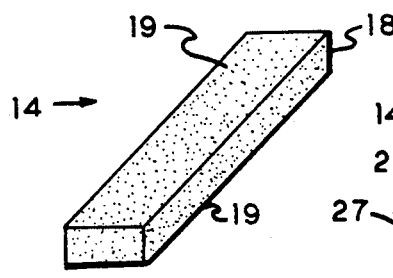
FIG. 3A discloses a first embodiment of the instant invention.
Figure 3B:
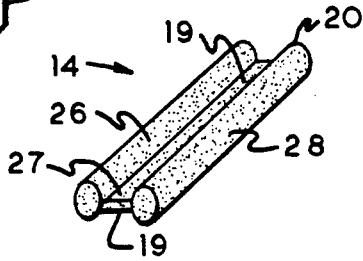
FIG. 3B discloses a second embodiment of the instant invention.
Figure 3C:
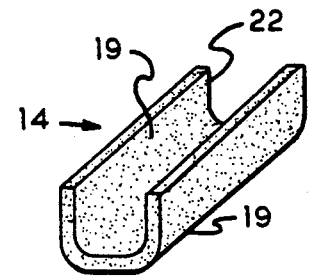
FIG. 3C discloses a third embodiment of the instant invention.

FIGS. 3A, 3B, and 3C disclose three different embodiments of the invention. FIG. 3A shows the rectangular configuration 18. Low tack adhesive 19 is place don both sides. FIG. 3B discloses the second configuration 20. The second configuration 20 consists of two elongated cylinders 26, 28 connected by a thin rectangular strip 27. Low tack adhesive 19 is placed on both sides of the second embodiment 20. FIG. 3C discloses a U-shaped configuration 22. Again low tack adhesive 19 is placed on both sides.

These three different configurations are designed to permit use with any of a variety of frame-lens configurations.

The strip members 14, 18, 20, and 22 are composed of clear plastic and the low tack adhesive 19 is also clear as to blend with the lens 12 and the frame 13.

It is to be understood that the present invention is not limited to the embodiments described above, but encompasses any and all embodiments within the scope of the following claims.

I claim:

1. A temporary lens securing device for use in an eyeglasses frame assembly, the assembly including an eyeglasses frame and at least one lens, said temporary lens securing device comprising:
- a strip member;
- said strip member being made of a transparent plastic material;
- means defining a strip member upper side and a strip member lower side;
- a low-tack adhesive coating on said upper side;
- a low-tack adhesive coating on said lower side;
- said low-tack adhesive coating being made of a transparent material;
- whereby in use, said strip member upper side is affixed to the eyeglasses frame at a predetermined location and said lens is placed in said frame and engaged by said strip member lower side, said strip member thus being affixed intermediate the lens and the frame, thereby enabling the lens to be secured to the frame by said lens securing device.

2. A temporary lens securing device as claimed in claim 1 wherein said strip member has a generally rectangular configuration.

3. A temporary lens securing device as claimed in claim 1 wherein said strip member comprises two elongated cylinders connected by a thin rectangular strip.

4. A temporary lens securing device as claimed in claim 1 wherein said strip member has a generally U-shaped configuration.

* * * * *